United States Patent
Lin

(10) Patent No.: US 9,182,749 B2
(45) Date of Patent: Nov. 10, 2015

(54) NETWORK-BASED POWER SUPPLY EFFICIENCY MANAGEMENT SYSTEM AND A METHOD THEREOF

(71) Applicant: LIGHTSTAR INFORMATION CO., LTD., New Taipei (TW)

(72) Inventor: Ming-Yi Lin, New Taipei (TW)

(73) Assignee: Lightstar Information Co., Ltd., New Taipei (TW)

( * ) Notice: Subject to any disclaimer, the term of this patent is extended or adjusted under 35 U.S.C. 154(b) by 467 days.

(21) Appl. No.: 13/624,751

(22) Filed: Sep. 21, 2012

(65) Prior Publication Data

US 2013/0079941 A1   Mar. 28, 2013

(30) Foreign Application Priority Data

Sep. 23, 2011   (TW) .............................. 100134266 A

(51) Int. Cl.
| | |
|---|---|
| G05D 3/12 | (2006.01) |
| G05B 15/02 | (2006.01) |
| H05B 37/02 | (2006.01) |
| G06Q 10/06 | (2012.01) |
| H05B 37/03 | (2006.01) |

(52) U.S. Cl.
CPC ................ *G05B 15/02* (2013.01); *G06Q 10/06* (2013.01); *H05B 37/0245* (2013.01); *H05B 37/034* (2013.01)

(58) Field of Classification Search
USPC .................................. 700/286, 291, 295, 297
See application file for complete search history.

(56) References Cited

U.S. PATENT DOCUMENTS

| | | | |
|---|---|---|---|
| 2010/0185336 A1* | 7/2010 | Rovnyak et al. ............... | 700/287 |
| 2010/0292857 A1* | 11/2010 | Bose et al. ..................... | 700/292 |
| 2011/0106328 A1* | 5/2011 | Zhou et al. .................... | 700/291 |
| 2012/0065802 A1* | 3/2012 | Seeber et al. ................. | 700/295 |

* cited by examiner

*Primary Examiner* — Darrin Dunn
(74) *Attorney, Agent, or Firm* — Rosenberg, Klein & Lee

(57) ABSTRACT

The present invention relates to a network-based power supply efficiency management system and a method thereof, and more particularly, to a method for managing a power supply efficiency by comparing a predefined scenario on a server side with a real environment condition, and then issuing a usage control command to a managed unit via a network connection.

6 Claims, 3 Drawing Sheets

NETWORK-BASED POWER SUPPLY EFFICIENCY MANAGEMENT SYSTEM AND A METHOD THEREOF

BACKGROUND OF THE INVENTION

1. Field of the Invention

The present invention relates to a network-based power supply efficiency management system and a method thereof, and more particularly, to a method for managing a power supply efficiency by comparing a predefined scenario on a server side with a real environment condition, and then issuing a usage control command to a managed unit via a network connection.

2. Description of the Prior Art

A traditional power supply control system uses a power distributing board and relays to control the power supplied to electrical appliances. Due to complex and inflexible power dispatch layouts among timers, power distributing boards, relays and electrical appliances, problems such as difficult construction work and maintenance, timer reset caused by power outage may arise, and any change/modification to the dispatch layouts could be difficult as well. Furthermore, managing power supply for offices, public areas, and underground parking lots having large power requirements is even harder; therefore, backup power or spare power supplies are provided to ensure stable service quality, although a considerable amount of electricity could be wasted. Meanwhile, human labors are required to perform maintenance work and inspection for any damaged power facilities; however, if it is necessary to upgrade the power facilities, there's no way to obtain information of each individual area or facility usage condition and to provide any decision-making information to achieve power saving and to improve power efficiency.

Therefore, the prior art technique has the following disadvantages:

1. difficult to maintain due to complex and inflexible power dispatch layouts;
2. high management and maintenance cost; and
3. high electricity bill and not easy to perform efficiency analysis.

SUMMARY OF THE INVENTION

The present invention relates to a network-based power supply efficiency management system and a method thereof. It is a first object of the present invention to provide a network-based and centralized power supply efficiency management method to reduce unnecessary power consumption. It is a second object of the present invention to provide power usage efficiency and state analysis to reduce maintenance cost. The present invention requires only a minimum number of maintenance staff to reduce power consumption for offices, buildings, communities, or factories.

The present invention discloses a network-based power supply efficiency management system and a method thereof, which comprises: (1) predefining and storing a scenario, condition, and usage control command; (2) regularly or randomly detecting and receiving a real environment condition and power efficiency and transmitting them to the server side via a network, storing the detected condition and comparing it to the predefined condition to see if they match, if not, then go to step 4; (3) when the detected real environment condition matches the predefined condition, then transmitting the predefined usage control command via the network and going to step 4; (4) end.

These features and advantages of the present invention will be fully understood and appreciated from the following detailed description of the accompanying Drawings.

Figure 1:
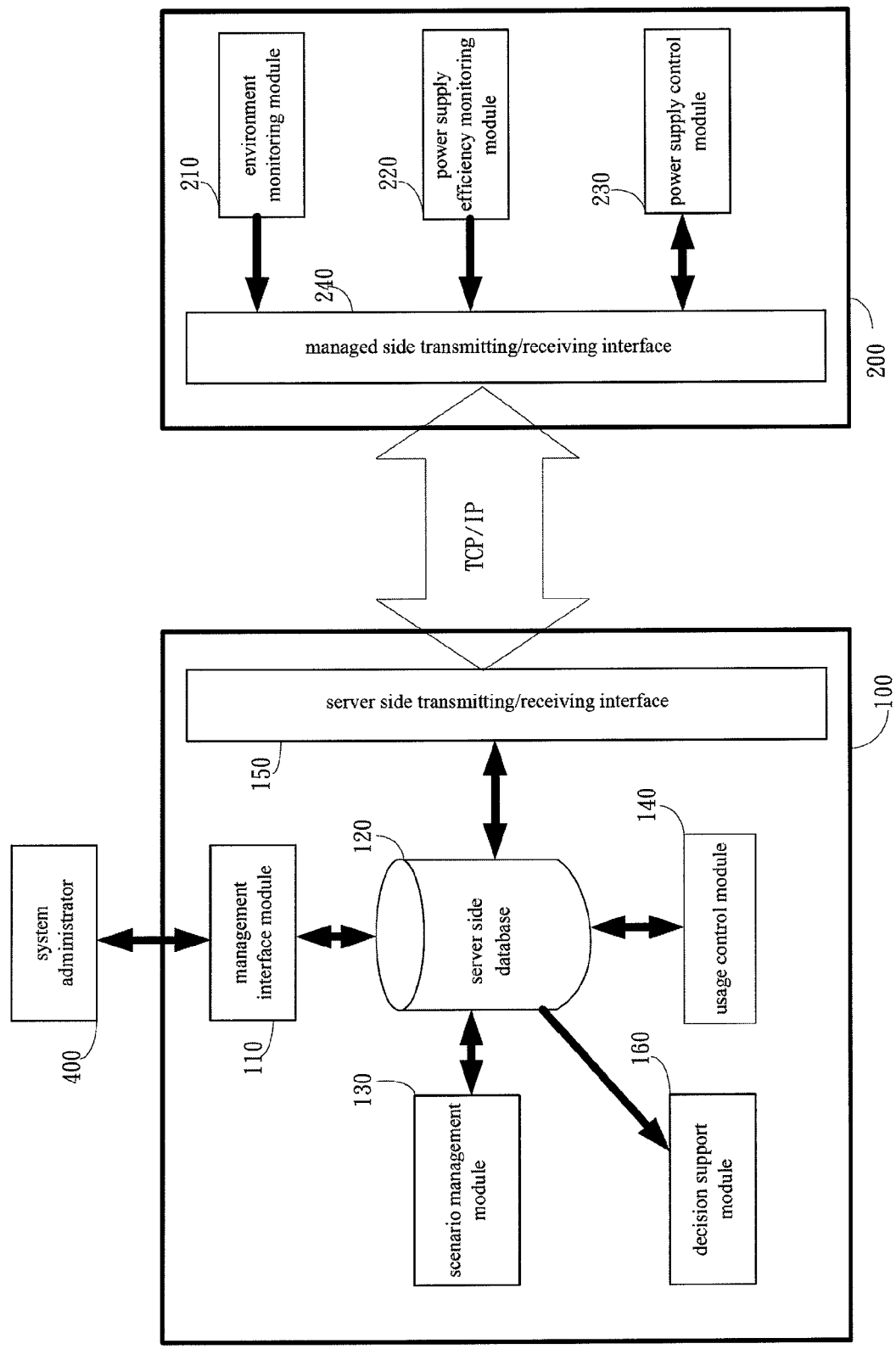
FIG. 1 illustrates a system structural view of a network-based power supply efficiency management system of the present invention.

REFERENCE NUMERALS 100 server side
110 management interface module
120 server side database
130 scenario management module
140 usage control module
150 server side transmitting/receiving interface
160 decision support module
200 managed side
200a1~200x15 managed side
210 environment monitoring module
220 power supply efficiency monitoring module
230 power supply control module
240 managed side transmitting/receiving interface
240a-240x managed side transmitting/receiving interface
400 system administrator

DETAILED DESCRIPTION OF THE PREFERRED EMBODIMENT

The present invention discloses a network-based power supply efficiency management system and a method thereof. Please refer to FIG. 1, which illustrates a system structural view of a network-based power supply efficiency management system of the present invention as follows:

The system structure of the present invention comprises a server side 100 and at least one managed side 200, wherein the server side 100 is connected to the managed side 200 via a TCP/IP network for the server side 100 to gather and record the state of the managed side 200, thereby controlling the power supplied to the managed side 200 to reduce power consumption and carbon emissions. The server side 100 is responsible for receiving and transmitting data, and storing all management setting data and system state data of the managed side 200; wherein the system state data of the managed side 200 comprises data such as environment condition, power supply efficiency and power supply control parameters. The server side 100 comprises a management interface module 110, a server side database 120, a scenario management module 130, a usage control module 140, a server side transmitting/receiving interface 150, and a decision support module 160, which will be described as follows:

The management interface module 110 provides a management interface for the system administrator 400 to manage the server side 100 or issues a command to the managed side 200.

The server side database 120 provides a storage space for storing data of the server side 100, and stores and computes data collected by the managed side 200 or other external data source.

The scenario management module 130 is provided for the system administrator 400 to manage the at least one managed side and to define parameters of the at least one managed side according to an environment condition and a usage control command. The usage control module 140 uses the usage control command to the usage control instruction to the at least one managed side 200.

The usage control module 140 performs the usage control instruction given to the managed side 200 by coupling with the managed side 200 via the server side transmitting/receiving interface 150 for issuing the usage control instruction to the managed side 200.

The server side transmitting/receiving interface 150 is provided for transmitting and receiving the data of the managed side 200, storing the received data to the server side database 120 and transmitting data and management instructions of the server side 100 to the managed side 200.

The decision support module 160 analyzes data stored in the server side database 120, such as an environment condition, facility power usage of the managed side 200 to provide decision information for the system administrator 400 to define a scenario management parameter. Therefore, the system administrator 400 can correctly set up effective parameters to both save energy and to maintain normal operations.

The managed side 200 is used for monitoring environment condition, supply power to the load, providing facility power usage data. The managed side 200 comprises an environment monitoring module 210, a power supply efficiency monitoring module 220, a power supply control module 230, a managed side transmitting/receiving interface 240, which will be described as follows:

The environment monitoring module 210 can use a reed switch, a temperature detector, a moisture detector, a brightness detector, or an object detector to monitor a condition of the environment and actively or passively reports the condition to the server side via a wired or a wireless network.

The power supply efficiency monitoring module 220 obtains power state information of the managed side, such as voltage, current and power efficiency, and actively or passively reporting the power state information to the server side 100.

The power supply control module 230 supplies power or cuts off power to a load according to the usage control instruction of the server side 100, and the power supply control module 230 can supply power at a designated voltage or current set by the server side 100.

The managed side transmitting/receiving interface 240 receives the data from the server side 100 and transmits the data reported by the managed side 200.

Figure 2:
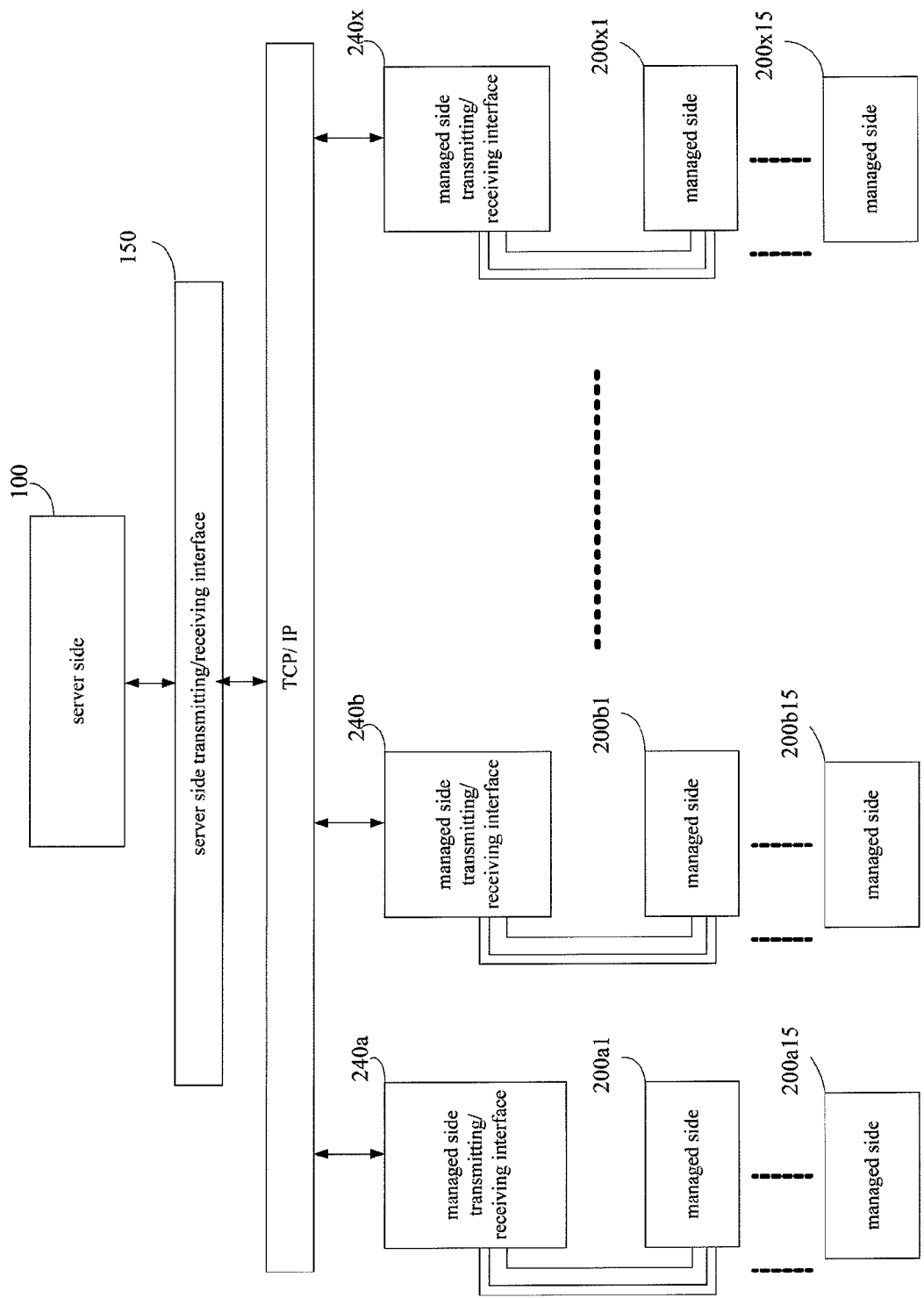
FIG. 2 illustrates a view of a network-based power supply efficiency management system of the present invention.

FIG. 2 illustrates a view of a network-based power supply efficiency management system of the present invention. The server side 100 is coupled with the managed side 200 via the server side transmitting/receiving interface 150, and the managed side 200a1~200x15 is coupled with the server side 100 respectively via the managed side transmitting/receiving interface 240a~240x using a TCP/IP network, as shown, the network can be a local area network (LAN) or a wide area network (WAN) using the Transmission Control Protocol (TCP) and Internet Protocol (IP) for connection management.

Figure 3:
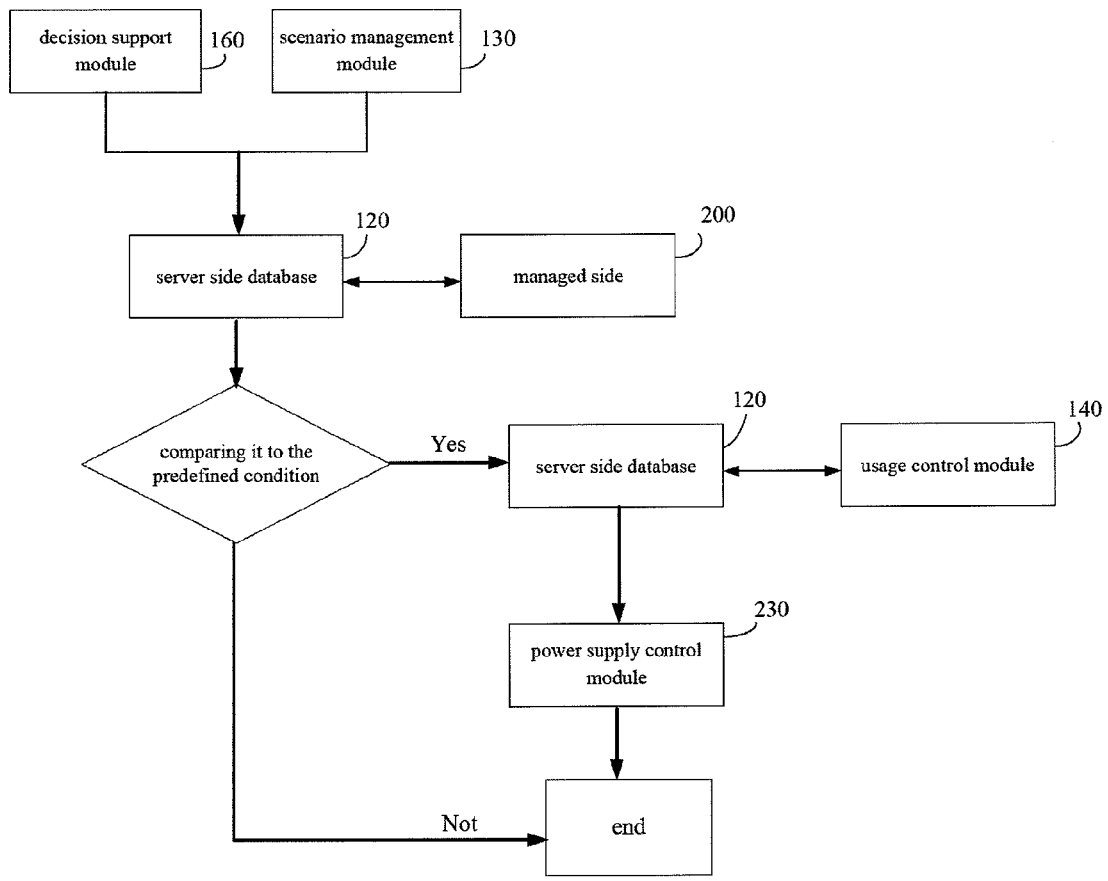
FIG. 3 illustrates a flowchart of a network-based power supply efficiency management method of the present invention.

FIG. 3 illustrates a flowchart of a network-based power supply efficiency management method of the present invention. According to the network-based power supply efficiency management system and its structure, the network-based power supply efficiency management method is described as follows:

(1) the system administrator 400 using the scenario management module 130 of the server side 100 to predefine one or more scenarios, one or more conditions and one or more usage control commands and to store the one or more scenarios, one or more conditions and one or more usage control commands in the server side database 120, or the system administrator 400 using an analysis data provided by the decision support module 160 to set a proper condition;

(2) the management interface module 110 regularly or randomly coupling to the at least one managed side 200 via the server side transmitting/receiving interface 150 connected with the managed side transmitting/receiving interface 240 through TCP/IP network, according to one or more than one defined time(s), to obtain power supply control data from the environment monitoring module 210, the power supply efficiency monitoring module 220 and power supply control module 230 to store the power supply control data in the server side database 120;

(3) the server side 100 comparing at least one of the scenarios and the conditions defined by the scenario management module 130 of the server side database 120 with the power supply control state data returned by the environment monitoring module 210, the power supply efficiency monitoring module 220, and the power supply control module 230 to see if at least one of the scenarios and the conditions match with the power supply control state data, if so, then going to step (4); if not, then going to step (5);

(4) the power supply control module 140 of the server side 100 transmitting the usage control command predefined by the scenario management module 130 and stored in the server side database 120 to one or more than one managed sides 200 via the TCP/IP network, then using the power supply control module 230 of the managed side 200 to perform power supply control;

(5) end.

As above, the present invention discloses a network-based power supply efficiency management system and a method thereof, which compares a scenario, condition, and usage control command predefined by the server side 100 with a environment condition and power supply efficiency of the managed side 200 to enhance the power supply efficiency. Therefore, the power supply can be shut off to reduce power consumption, thereby saving energy and reduce carbon emissions.

Although a preferred embodiment is proposed to illustrate the present invention, the present invention is not limited thereto. Those familiar with the art should know that, any method which can compare a predefined scenario, condition, or usage control command with the data reported by the managed side 200 via a network connection and perform a power supply change falls within the scope of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A network-based power supply efficiency management system, comprising:
   a server side comprising a management interface module, a server side database, a usage control module, a scenario management module, a decision support module, a power supply control module, and a server side transmitting/receiving interface, the server side transmitting/receiving interface connected to a network; the decision support module providing decision information to define a scenario management parameter; the power supply module providing a usage control command predefined by the scenario management module to at least one managed side via the network;

the least one managed side is connected to the server side via the network for monitoring a condition of the environment and reporting the condition to the server side;

wherein the management interface module provides a management interface to manage the server side or issuing a command to the managed side;

the server side database providing a storage space for storing data of the server side and storing and computing data received from the managed side via the server side transmitting/receiving interface;

the usage control module defining a usage control instruction in accordance with the usage control command and coupling with the managed side via the server side transmitting/receiving interface for issuing the usage control instruction to the managed side via the server side transmitting/receiving interface:

the scenario management module defining the usage control command according to the environment condition; and the managed side performing power supply control according to the usage control instruction via the power supply control module.

2. The network-based power supply efficiency management system as claimed in claim 1, wherein the managed side comprising an environment monitoring module, a power supply efficiency monitoring module, a power supply control module, a managed side transmitting/receiving interface; the environment monitoring module monitoring a condition of the environment and actively or passively reporting the condition to the server side via the managed side transmitting/receiving interface and the network; the power supply efficiency monitoring module obtaining power state information of the managed side and actively or passively reporting the power state information to the server side via the managed side transmitting/receiving interface and the network; the power supply control module supplying power or cutting off power to a load according to the usage control instruction of the server side received via the managed side transmitting/receiving interface and the network.

3. The network-based power supply efficiency management system as claimed in claim 1, wherein the network is a local area network (LAN) or a wide area network (WAN).

4. The network-based power supply efficiency management system as claimed in claim 3, wherein the power state information of the managed side provided by a power supply efficiency monitoring module is a voltage, current or a power usage efficiency data.

5. The network-based power supply efficiency management system as claimed in claim 1, wherein the environment monitoring module is a reed switch, a temperature detector, a moisture detector, a brightness detector, or an object detector.

6. A network-based power supply efficiency management method for system including at least one managed side connected through a network to a server side having a management interface module, a server side database, a usage control module, a scenario management module, a decision support module, and a server side transmitting/receiving interface, the method comprising the following steps:

(A) using the scenario management module of the server side to predefine one or more scenarios, one or more conditions and one or more usage control commands and to store one or more scenarios, one or more conditions and one or more usage control commands in the server side database, or using an analysis data provided by the decision support module to set an environment condition;

(B) using the management interface module to regularly or randomly couple to the at least one managed side via the server side transmitting/receiving interface and a managed side transmitting/receiving interface, according to one or more than one defined time(s), to obtain power supply control data from an environment monitoring module, the power supply efficiency monitoring module and the power supply control module to store the power supply control data in the server side database;

(C) detecting and receiving a real environment condition regularly or randomly and transmitting the real environment condition to the server side, comparing the real environment condition with the environment condition to see if they match, if so, then goes to step (D), if not, then go to step (E);

(D) using the power supply control module of the server side to transmit the usage control command predefined by the scenario management module and stored in the server side database to the managed sides via the network, then using the power supply control module of the managed side to perform power supply control and then going to step (E);

(E) end.

* * * * *